United States Patent
Sasaki

(10) Patent No.: US 10,593,479 B2
(45) Date of Patent: Mar. 17, 2020

(54) MULTILAYER CERAMIC CAPACITOR

(71) Applicant: TAIYO YUDEN CO., LTD., Chuo-ku, Tokyo (JP)

(72) Inventor: Takashi Sasaki, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 1 day.

(21) Appl. No.: 16/134,815

(22) Filed: Sep. 18, 2018

(65) Prior Publication Data

US 2019/0096583 A1 Mar. 28, 2019

(30) Foreign Application Priority Data

Sep. 25, 2017 (JP) .................................. 2017-183248

(51) Int. Cl.
| | |
|---|---|
| *H01G 4/248* | (2006.01) |
| *H01G 4/30* | (2006.01) |
| *H01G 4/012* | (2006.01) |
| *H01G 4/232* | (2006.01) |
| *H01G 4/12* | (2006.01) |

(52) U.S. Cl.
CPC .............. *H01G 4/248* (2013.01); *H01G 4/012* (2013.01); *H01G 4/232* (2013.01); *H01G 4/30* (2013.01); *H01G 4/12* (2013.01)

(58) Field of Classification Search
None
See application file for complete search history.

(56) References Cited

U.S. PATENT DOCUMENTS

| | | | | |
|---|---|---|---|---|
| 8,107,217 B2* | 1/2012 | Togashi | ................. | H01G 4/012 |
| | | | | 361/303 |
| 8,194,389 B2* | 6/2012 | Lee | ......................... | H01G 4/30 |
| | | | | 361/303 |
| 9,947,472 B2* | 4/2018 | Mukobata | .............. | H01G 4/012 |
| 10,170,247 B2* | 1/2019 | Mukobata | ................ | H01G 4/30 |
| 10,199,170 B2* | 2/2019 | Sasaki | ....................... | H01G 4/12 |
| 2006/0126264 A1* | 6/2006 | Yoshii | .................... | H01G 4/232 |
| | | | | 361/301.1 |
| 2014/0367152 A1* | 12/2014 | Lee | ........................ | H05K 1/111 |
| | | | | 174/260 |
| 2015/0287533 A1* | 10/2015 | Lee | ......................... | H01G 4/30 |
| | | | | 174/260 |

(Continued)

FOREIGN PATENT DOCUMENTS

JP 2015228481 A 12/2015

*Primary Examiner* — Dion Ferguson
(74) *Attorney, Agent, or Firm* — Law Office of Katsuhiro Arai

(57) ABSTRACT

In an exemplary embodiment, each of external electrodes 12 of a multilayer ceramic capacitor 10 continuously has a first planar part 12a present on each end face of a capacitor body 11 in a first direction d1, a second planar part 12b present on one end face of the capacitor body 11 in a third direction d3, and auxiliary planar parts 12c present on both end faces of the capacitor body 11 in a second direction d2. A maximum third-direction dimension D3 [12c] of each of the auxiliary planar parts 12c is smaller than a third-direction dimension D3 [12a] of the first planar part 12a, while a first-direction dimension D1 [12c] of each of the auxiliary planar parts 12c is smaller than a first-direction dimension D1 [12b] of the second planar part 12b.

9 Claims, 6 Drawing Sheets

(56) References Cited

U.S. PATENT DOCUMENTS

| | | | |
|---|---|---|---|
| 2016/0163455 A1* | 6/2016 | Iwama | H01G 4/012 361/301.4 |
| 2017/0250028 A1* | 8/2017 | Makino | H01G 4/012 |
| 2018/0020545 A1* | 1/2018 | Ahn | H01G 4/012 |
| 2018/0268998 A1* | 9/2018 | Onodera | H01G 4/2325 |
| 2019/0131072 A1* | 5/2019 | Onodera | H01G 2/065 |

* cited by examiner

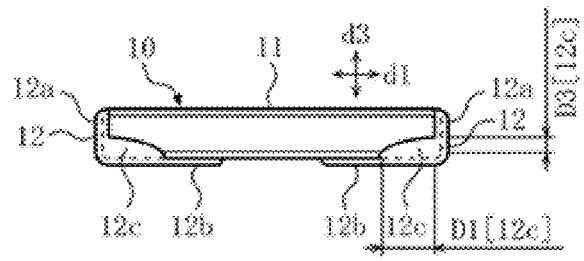
FIG. 1A
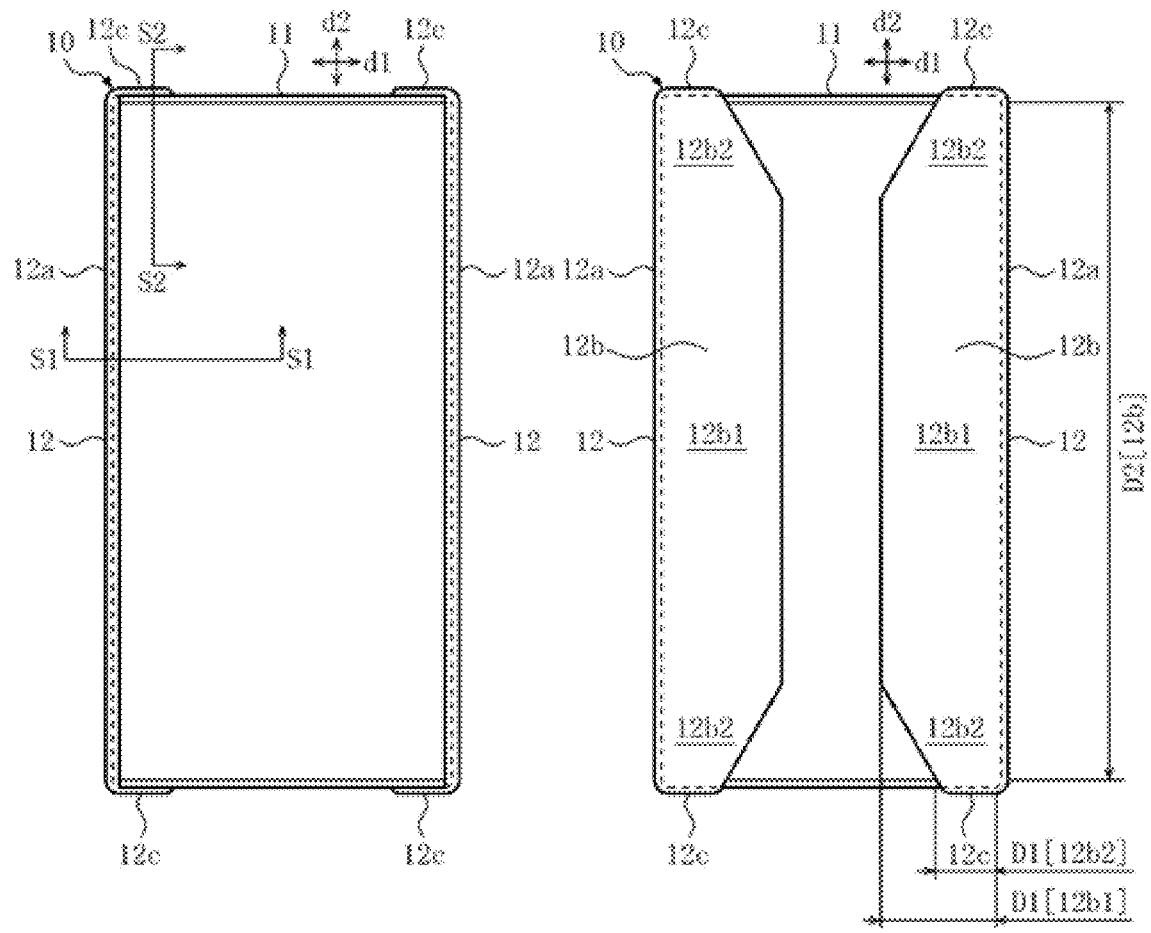
FIG. 1B
FIG. 1C
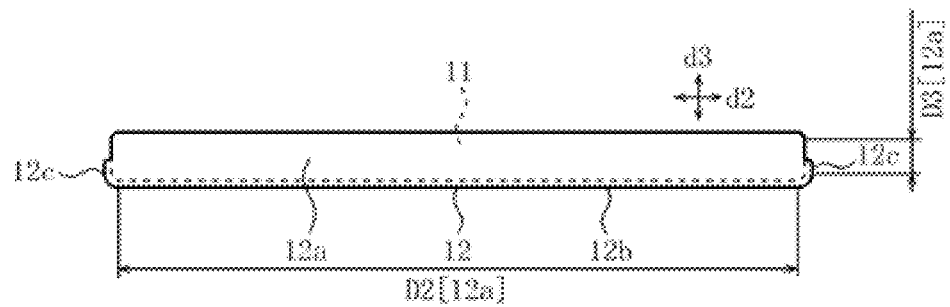
FIG. 1D

MULTILAYER CERAMIC CAPACITOR

BACKGROUND

Field of the Invention

The present invention relates to a multilayer ceramic capacitor comprising: a capacitor body of roughly rectangular solid shape which has a capacitive part constituted by multiple internal electrode layers stacked together with dielectric layers in between; a first external electrode which is provided at one of two opposing end parts of the capacitor body and to which some of the multiple internal electrode layers are connected; and a second external electrode which is provided at the other of two opposing end parts of the capacitor body and to which the remainder of the multiple internal electrode layers are connected.

Description of the Related Art

As smartphones, tablet PCs, and other electronic devices become increasingly thinner, there is a strong call for making the multilayer ceramic capacitors to be built into these electronic devices also thinner. An effective way to make a thin multilayer ceramic capacitor of the aforementioned constitution, is to adopt a thin capacitor body, and also adopt respective first and second external electrodes of the two-face type as shown in FIGS. 5 and 6 of Patent Literature 1 mentioned below, or specifically of the type of which longitudinal parts and lateral parts form a continuous, roughly L-shaped longitudinal cross-section; however, doing so gives rise to the concerns described below.

(Concern 1)
A generally adopted method to solder the respective external electrodes of a multilayer ceramic capacitor to conductor pads on a circuit board, is to apply a cream solder on the corresponding conductor pads, install the multilayer ceramic capacitor onto the circuit board by pressing the lateral parts of the respective external electrodes against the cream solder applied on the pads, and then put in a reflow oven the circuit board on which the multilayer ceramic capacitor has been installed, to melt, and then cure, the cream solder (reflow soldering).

The cream solder applied on the respective conductor pads melts while in contact with the lateral parts of the external electrodes, so some of the molten solder flows into the space between each conductor pad and the lateral part of each external electrode and also around the periphery of the lateral part of each external electrode, while the remainder of the molten solder tends to wet the other parts of each external electrode. When the external electrodes are of the two-face type, however, the solder can only wet the longitudinal part of each external electrode, and inevitably the remainder of the molten solder wets this longitudinal part to a great extent. Also, the quantity of the remainder of the molten solder is determined by the flowing quantity of some of the molten solder as mentioned above, and therefore the quantity of the remainder of the molten solder varies between the external electrodes. In other words, wetting the longitudinal part of each external electrode with the solder in the same manner is extremely difficult, and therefore separation, rise, and other phenomena may occur in some areas of the multilayer ceramic capacitor during soldering due to these different wettings by the solder.

(Concern 2)
As the multilayer ceramic capacitor is installed on the circuit board, with the lateral parts of the external electrodes pressed against the cream solder applied on the respective conductor pads of the circuit board, the multilayer ceramic capacitor deflects three-dimensionally due to the pressing force from a mounter transfer equipment, etc. Since each external electrode of two-face type has its longitudinal part continuing to its lateral part to create a roughly L-shaped longitudinal cross-section, it is difficult to reduce, at each external electrode, the three-dimensional deflection the multilayer ceramic capacitor undergoes during installation. In other words, the longitudinal part and lateral part that constitute each external electrode do not contribute much to the reduction of deflection of the multilayer ceramic capacitor, and therefore making the multilayer ceramic capacitor thin may cause the capacitor body to crack due to deflection.

BACKGROUND ART LITERATURES

[Patent Literature 1] Japanese Patent Laid-open No. 2015-228481

SUMMARY

An object of the present invention is to provide a multilayer ceramic capacitor capable of minimizing the concerns presented by the external electrodes of two-face type.

Any discussion of problems and solutions involved in the related art has been included in this disclosure solely for the purposes of providing a context for the present invention, and should not be taken as an admission that any or all of the discussion were known at the time the invention was made.

To achieve the aforementioned object, the multilayer ceramic capacitor pertaining to the present invention is a multilayer ceramic capacitor comprising: a capacitor body of roughly rectangular solid shape which has a capacitive part constituted by multiple internal electrode layers stacked together with dielectric layers in between; a first external electrode which is provided at one of two opposing end parts of the capacitor body and to which some of the multiple internal electrode layers are connected; and a second external electrode which is provided at the other of two opposing end parts of the capacitor body and to which the remainder of the multiple internal electrode layers are connected; wherein, when, with respect to the capacitor body, the direction in which two opposing faces are facing each other represents a first direction, the direction in which other two opposing faces are facing each other represents a second direction, the direction in which the remaining two opposing faces are facing each other represents a third direction, and the dimensions along the respective directions represent a first-direction dimension, a second-direction dimension, and a third-direction dimension, then: the first external electrode continuously has a first planar part present on one end face of the capacitor body in the first direction, a second planar part present on one end face of the capacitor body in the third direction, and auxiliary planar parts present on both end faces of the capacitor body in the second direction; the second external electrode continuously has a first planar part present on the other end face of the capacitor body in the first direction, a second planar part present on one end face of the capacitor body in the third direction, and auxiliary planar parts present on both end faces of the capacitor body in the second direction; a maximum third-direction dimension of each of the auxiliary planar parts of the first external electrode is smaller than the third-direction dimension of the first planar part of the first external electrode, while the first-direction dimension of each of the auxiliary planar parts is smaller than the first-direction dimension of the second planar part of the first external electrode; and a maximum third-direction dimension of each of the auxiliary planar parts of the second external electrode is smaller than the third-direction dimension of the first planar part of the second external electrode, while the first-direction dimension of each of the auxiliary planar parts is smaller than the first-direction dimension of the second planar part of the second external electrode.

According to the multilayer ceramic capacitor pertaining to the present invention, the concerns presented by the external electrodes of two-face type can be minimized.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

FIG. 1A is a front view, FIG. 1B is a plan view, FIG. 1C is a bottom view, and FIG. 1D is a right side view, of a multilayer ceramic capacitor to which the present invention is applied.

DESCRIPTION OF THE SYMBOLS

Figure 2:
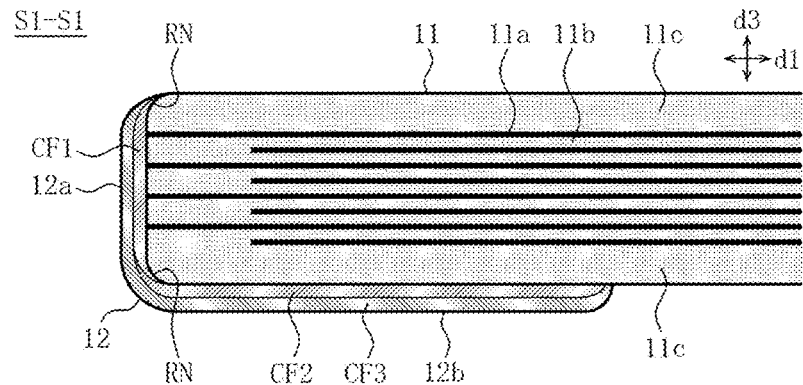
FIG. 2 is an enlarged view of the cross-section along line S1-S1 in FIG. 1B.

10—Multilayer ceramic capacitor, 11—Capacitor body, 11*a*—Internal electrode layers, 11*b*—Dielectric layers, RN—Rounded parts, 12—External electrodes, 12*a*—First planar part, 12*b*—Second planar part, 12*b*1—Center portion, 12*b*2—End part portions, 12*c*—Auxiliary planar parts, CF1—First conductor film, CF2—Second conductor film, CF3—Third conductor film, CF11—First conductor film, CF12—Second conductor film.

DETAILED DESCRIPTION OF EMBODIMENTS

With respect to a capacitor body 11 described below, the direction in which two opposing faces are facing each other (corresponding to the lateral direction in FIGS. 1A to 1C, and also corresponding to the direction in which external electrodes 12 described below are facing) is denoted by "a first direction d1," the direction in which other two opposing faces are facing each other (corresponding to the vertical direction in FIGS. 1B and 1C and the lateral direction in FIG. 1D) is denoted by "a second direction d2," and the direction in which the remaining two opposing faces are facing each other (corresponding to the vertical direction in FIGS. 1A and 1D, and also corresponding to the direction in which internal electrode layers 11*a* described below are stacked) is denoted by "a third direction d3," in the following explanations, for the sake of convenience. Also, with respect to each constitutional element, the dimension along the first direction d1 is denoted by "a first-direction dimension D1 [a symbol of constitutional element]," the dimension along the second direction d2 is denoted by "a second-direction dimension D2 [a symbol of constitutional element], and the dimension along the third direction d3 is denoted by "a third-direction dimension D3 [a symbol of constitutional element]." It should be noted that the values illustrated as respective dimensions D1 [a symbol of constitutional element] to D3 [a symbol of constitutional element], are reference dimensions for the purpose of design and do not include dimensional tolerances for the purpose of manufacturing.

First, the constitution of a multilayer ceramic capacitor 10 to which the present invention is applied, is explained using FIGS. 1A to 3.

The multilayer ceramic capacitor 10 comprises: a capacitor body 11 of roughly rectangular solid shape which has a capacitive part (not accompanied by a symbol) constituted by multiple internal electrode layers 11*a* (a total of eight layers in FIGS. 2 and 3) stacked together with dielectric layers 11*b* (a total of seven layers in FIGS. 2 and 3) in between; a first external electrode 12 which is provided at one end part of the capacitor body 11 in the first direction d1 and to which some of the multiple internal electrode layers 11*a* (a total of four layers in FIGS. 2 and 3) are connected; and a second external electrode 12 which is provided at the other end part of the capacitor body 11 in the first direction d1 and to which the remainder of the multiple internal electrode layers 11*a* (a total of four layers in FIGS. 2 and 3) are connected. The capacitor body 11 has rounded parts RN covering all of its ridges and corners (refer to FIGS. 4, 6 and 7). It should be noted that the first external electrode 12 and the second external electrode 12 are constitutionally identical and therefore denoted using the same symbols.

For reference, the capacitor body 11 of the prototype on which FIGS. 1A to 3 are based, has a first-direction dimension D1 [11] of 500 µm, a second-direction dimension D2 [11] of 1000 µm, a third-direction dimension D3 [11] of 70 µm, and a radius of curvature of the rounded parts RN of 10 µm. In other words, the first-direction dimension D1 [11], the second-direction dimension D2 [11], and the third-direction dimension D3 [11] of the capacitor body 11 have a dimensional relation of "the third-direction dimension D3 [11]<the first-direction dimension D1 [11]<the second-direction dimension D2 [11]."

Figure 3:
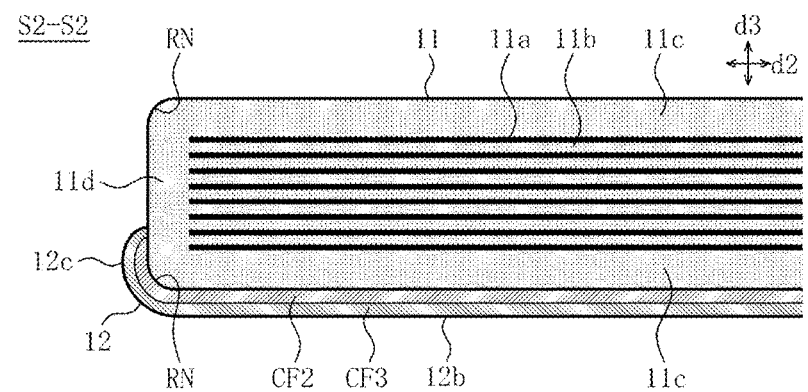
FIG. 3 is an enlarged view of the cross-section along line S2-S2 in FIG. 1B.

Each of the internal electrode layers 11a is rectangular in shape, and a first-direction dimension D1 [11a], a second-direction dimension D2 [11a] and a third-direction dimension D3 [11a] thereof are roughly the same. The number of the dielectric layers 11b corresponds to the number of the internal electrode layers 11a minus 1, and each of the dielectric layers 11b has roughly a same third-direction dimension D3 [11b]. Also, the capacitive part (not accompanied by a symbol) constituted by the multiple internal electrode layers 11a and the multiple dielectric layers 11b is surrounded by dielectric margin parts 11c on both sides in the third direction d3, and by dielectric margin parts 11d on both sides in the second direction d2, as shown in FIGS. 2 and 3. The multiple internal electrode layers 11a are staggered alternately in the first direction d1, and the ends in the first direction d1 of the odd-numbered internal electrode layers 11a from the top in FIGS. 2 and 3 are connected to the first external electrode 12, while the ends in the first direction d1 of the even-numbered internal electrode layers 11a from the top in FIGS. 2 and 3 are connected to the second external electrode 12.

For reference, the prototype is configured such that each of the internal electrode layers 11a has the first-direction dimension D1 [11a] of 420 μm and the second-direction dimension D2 [11a] of 940 μm, each of the dielectric margin parts 11c has a third-direction dimension D3 [11c] of 20 μm, and each of the dielectric margin parts 11d has a second-direction dimension D2 [11d] of 30 μm. While a total of the eight internal electrode layers 11a and a total of the seven dielectric layers 11b are depicted in FIGS. 2 and 3 for the sake of illustration, the number of the internal electrode layers 11a and the third-direction dimension D3 [11a], and the third-direction dimension D3 [11b] of the dielectric layers 11b, including the first-direction dimension D1 [11a] and the second-direction dimension D2 [11a] of each of the internal electrode layers 11a, may be changed in any way as desired according to the target capacitance value. Although affected by the target capacitance value, the third-direction dimension D3 [11a] of the internal electrode layers 11a, and the third-direction dimension D3 [11b] of the dielectric layers 11b, are preferably in a range of 0.3 to 2.0 μm.

To add on the materials for the internal electrode layers 11a, etc., the primary component of each of the internal electrode layers 11a of the capacitor body 11 is preferably a metal selected from the group that includes nickel, copper, palladium, platinum, silver, gold, and alloys thereof, and the like. Also, the primary component of each of the dielectric layers 11b, each of the dielectric margin parts 11c and each of the dielectric margin parts 11d of the capacitor body 11, is preferably a dielectric ceramic selected from the group that includes barium titanate, strontium titanate, calcium titanate, magnesium titanate, calcium zirconate, calcium zirconate titanate, barium zirconate and titanium oxide, and the like. It should be noted that the primary component of each of the dielectric layers 11b may be different from the primary component of each of the dielectric margin parts 11c and each of the dielectric margin parts 11d, or the primary component of each of the dielectric layers 11b, the primary component of each of the dielectric margin parts 11c, and the primary component of each of the dielectric margin parts 11d, may all be different.

The first external electrode 12 continuously has a first planar part 12a present on one end face (the left end face in FIG. 1B) in the first direction d1 of the capacitor body 11, a second planar part 12b present on one end face (the bottom end face in FIG. 1A) in the third direction d3 of the capacitor body 11, and auxiliary planar parts 12c present on both end faces (the top end face and the bottom end face in FIG. 1B) in the second direction d2 of the capacitor body 11. As described above, the capacitor body 11 has the rounded parts RN covering all of its ridges and corners (refer to FIGS. 4, 6 and 7), so the first planar part 12a, the second planar part 12b and the auxiliary planar parts 12c of the first external electrode 12 are continuously connected to each other along the rounded parts RN.

The second external electrode 12 continuously has a first planar part 12a present on the other end face (the right end face in FIG. 1B) in the first direction d1 of the capacitor body 11, a second planar part 12b present on one end face (the bottom end face in FIG. 1A) in the third direction d3 of the capacitor body 11, and auxiliary planar parts 12c present on both end faces (the top and bottom end faces in FIG. 1B) in the second direction d2 of the capacitor body 11. As described above, the capacitor body 11 has the rounded parts RN covering all of its ridges and corners (refer to FIGS. 4, 6 and 7), so the first planar part 12a, the second planar part 12b, and the auxiliary planar parts 12c of the second external electrode 12 are continuously connected to each other along the rounded parts RN.

Now, the relations of dimensions of the first planar part 12a, dimensions of the second planar part 12b, and dimensions of each of the auxiliary planar parts 12c, of each of the external electrodes 12, and the like are explained. It should be noted that, in the following explanations, a second-direction dimension D2 [12a] and a third-direction dimension D3 [12a] of the first planar part 12a are understood, for the sake of convenience, as the dimensions of the area of the first planar part 12a excluding the parts corresponding to the rounded parts RN, as shown in FIG. 1D. Also, first-direction dimensions D1 [12b1, 12b2] and a second-direction dimension D3 [12b] of the second planar part 12b are understood, for the sake of convenience, as the dimensions of the area of the second planar part 12b excluding the parts corresponding to the rounded parts RN, as shown in FIG. 1C. Furthermore, a first-direction dimension D1 [12c] and a maximum third-direction dimension D3 [12c] of each of the auxiliary planar parts 12c are understood, for the sake of convenience, as the dimensions of the area of the auxiliary planar parts 12c excluding the parts corresponding to the rounded parts RN, as shown in FIG. 1A. The dimensions are understood this way because the capacitor body 11 has the rounded parts RN covering all of its ridges and corners and thus it is difficult to specify the boundaries of the first planar part 12a, the second planar part 12b and each of the auxiliary planar parts 12 along the rounded parts RN, which is to say, because the rounded parts RN are partially shared by the first planar part 12a, the second planar part 12b and each of the auxiliary planar parts 12.

The maximum third-direction dimension D3 [12c] of each of the auxiliary planar parts 12c of each of the external electrodes 12 is smaller than the third-direction dimension D3 [12a] of the first planar part 12a of each of the external electrodes 12, and also the first-direction dimension D1 [12c] of each of the auxiliary planer parts 12c is smaller than a first-direction dimension D1 [12b] of the second planar part 12b of each of the external electrodes 12. Also, the maximum third-direction dimension D3 [12c] of each of the auxiliary planar parts 12c of each of the external electrodes 12 is smaller than a first-direction dimension D1 [12c] of each of the auxiliary planar parts 12c. It should be noted that, while the outline of each of the auxiliary planar parts 12c of each of the external electrodes 12 is depicted as a convex curving line in FIG. 1A (same in FIGS. 7 to 8B), such convex curving line need not be used so long as a similar outline is formed, and a wavy line, a broken line, a straight line, a concave curving line, etc., may be used.

Furthermore, the second planar part 12b of each of the external electrodes 12 has, at both its end parts in the second direction d2, end part portions 12b2 whose first-direction dimension D1 [12b2] becomes smaller toward each end face of the capacitor body 11 in the second direction d2, and a minimum first-direction dimension D1 [12b2] of each of the end part portions 12b2 corresponds to the first-direction dimension D1 [12c] of each of the auxiliary planar parts 12c of each of the external electrodes 12. It should be noted that, at the second planar part 12b of each of the external electrodes 12, a center portion 12b1 between the two end part portions 12b2 is rectangular in shape.

For reference, when the dimension of the first planar part 12a, the dimension of the second planar part 12b, and the dimension of each of the auxiliary planar parts 12c, of each of the external electrodes 12, are understood as mentioned above, then the prototype is configured such that the first planar part 12a of each of the external electrodes 12 has a second-direction dimension D2 [12a] of 980 µm and a third-direction dimension D3 [12a] of 50 µm. Also, a first-direction dimension D1 [12b1] of the center portion 12b1 of the second planar part 12b of each of the external electrodes 12 is 170 µm, the minimum first-direction dimension D1 [12b2] of each of the end part portions 12b2 is 80 µm, a second-direction dimension D2 [12b] of the second planar part 12b is 980 µm, and the interval, in the first direction d1, between the center portion 12b1 of the second planar part 12b of the first external electrode 12 and the center portion 12b1 of the second planar part 12b of the second external electrode 12, is 140 µm. Furthermore, each of the auxiliary planar parts 12c of each of the external electrodes 12 has a first-direction dimension D1 [12c] of 80 µm and a maximum third-direction dimension D3 [12c] of 30 µm.

It should be noted that each of the external electrodes 12 has, as shown in FIGS. 2 and 3, a first conductor film CF1 provided on the end faces (the left end face and the right end face in FIG. 1B) of the capacitor body 11 in the first direction d1, a second conductor film CF2 continuously provided on a part of the first conductor film CF1, one end face (the bottom end face in FIG. 1A) of the capacitor body 11 in the third direction d3 and both end faces (the top end face and the bottom end face in FIG. 1B) of the capacitor body 11 in the second direction d2, and a third conductor film CF3 provided on the surfaces of the first conductor film CF1 and the second conductor film CF2.

To add on the materials for the first conductor film CF1, etc., the primary component of the first conductor film CF1 is preferably a metal selected from the group that includes nickel, copper, palladium, platinum, silver, gold, alloys thereof, and the like. Also, the primary component of the second conductor film CF2 is preferably a metal selected from the group that includes copper, tin, nickel, gold, zinc, alloys thereof, and the like, which is different from the primary component of the first conductor film CF1. Furthermore, the primary component of the third conductor film CF3 is preferably a metal selected from the group that includes copper, tin, nickel, gold, zinc, alloys thereof, and the like, which is different from the primary component of the first conductor film CF1.

Next, FIGS. 4 to 7 are used to explain a method for producing the external electrodes 12, or specifically, a production method where the primary component of the first conductor film CF1 is nickel and the primary component of the second conductor film CF2 and the third conductor film CF3 is copper. It should be noted that the production method explained here is only a preferred example and does not limit in any way how the external electrodes 12 are produced.

In this case, an unsintered capacitor body 11 or a sintered capacitor body 11 is prepared before the external electrodes 12 are produced. An unsintered capacitor body 11 can be prepared by any known method, such as one that includes a step to stack on top of each other and pressure-weld together ceramic green sheets and ceramic green sheets having internal electrode layer patterns, a step to cut the unsintered multilayer sheet obtained through the foregoing step, and a step to barrel or otherwise polish the unsintered chips obtained through the foregoing step, while a sintered capacitor body 11 can be prepared by implementing, after the aforementioned polishing step, a step to put the multiple unsintered capacitor bodies 11 into a sintering oven and then sinter (including a binder removal process and a sintering process) them all at once.

Figure 4:
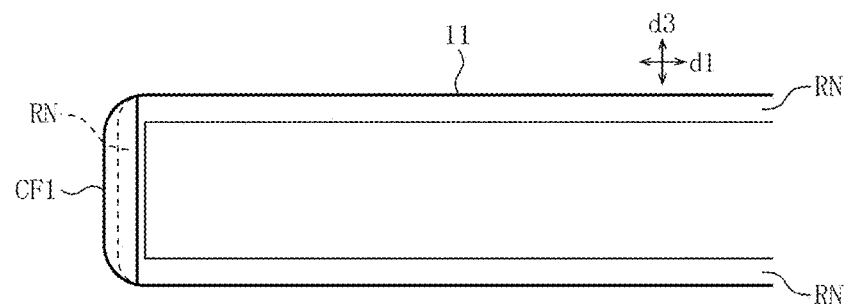
FIG. 4 is a drawing explaining a method for producing the external electrodes shown in FIGS. 1A to 1D.

When starting from the unsintered capacitor body 11, a conductor paste containing nickel powder is applied on the end faces (the left end face and the right end face in FIG. 1B) of the unsintered capacitor body 11 in the first direction d1, by means of dipping, printing or other method, after which the applied paste is sintered simultaneously with the unsintered capacitor body 11 to form a first conductor film CF1 made of nickel, as shown in FIG. 4. When starting from the sintered capacitor body 11, on the other hand, a conductor paste is applied on the end faces (the left end face and the right end face in FIG. 1B) of the sintered capacitor body 11 in the first direction d1, by means of dipping, printing or other method, after which the applied paste is baked to form a first conductor film CF1 made of nickel, as shown in FIG. 4. Either way, ideally when forming the first conductor film CF1, the outer periphery portion of the first conductor film CF1 does not go over the rounded parts RN around the peripheries of respective end faces of the capacitor body 11 in the first direction d1, as shown in FIG. 4. It should be noted that the thickness of the first conductor film CF1 formed here, is preferably around 4 µm.

Figure 5:
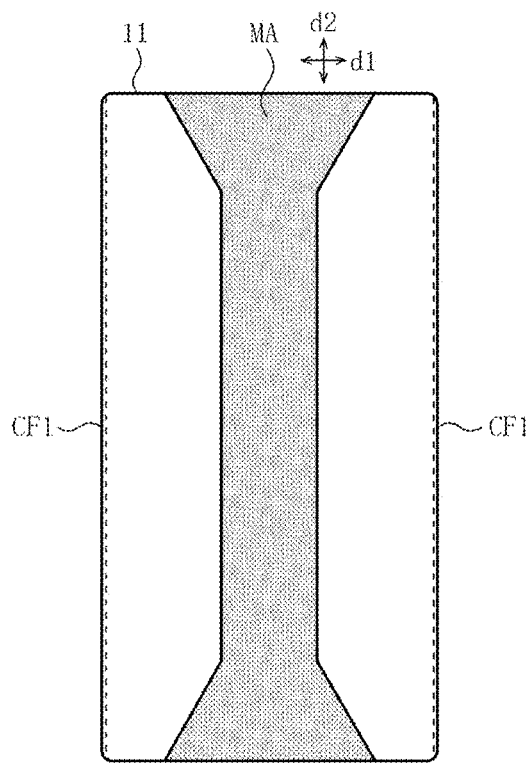
FIG. 5 is a drawing explaining a method for producing the external electrodes shown in FIGS. 1A to 1D.
Figure 6:
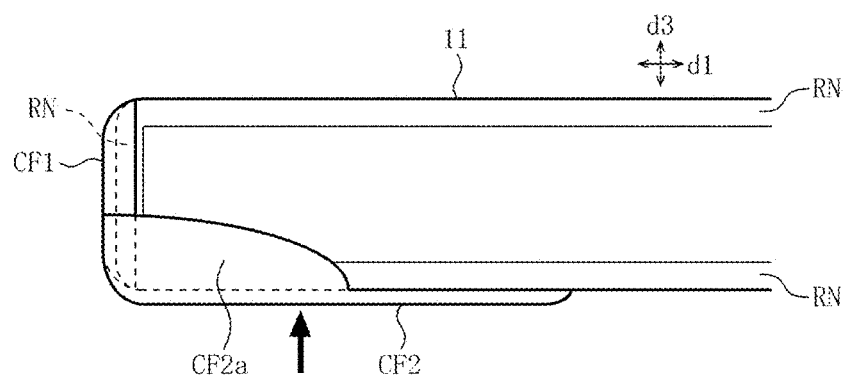
FIG. 6 is a drawing explaining a method for producing the external electrodes shown in FIGS. 1A to 1D.

Once the first conductor film CF1 has been formed, a mask MA having a shape that corresponds to the outline of the second planar part 12b of each of the external electrodes 12 is provided on one end face (the bottom end face in FIG. 1A) of the capacitor body 11 in the third direction d3, as shown in FIG. 5, after which a second conductor film CF2 made of copper is formed, by means of sputtering, vacuum deposition, or other dry plating method, toward one end face (the bottom end face in FIG. 1A) of the capacitor body 11 in the third direction d3, as shown by the arrow in FIG. 6. Because rounded parts RN are present around each end face of the capacitor body 11 in the second direction d2, and the periphery of the first conductor film CF1 is also rounded in accordance with the rounded parts RN, the second conductor film CF2 is formed, in a shape corresponding to the mask MA, on one end face (the bottom end face in FIG. 1A) of the capacitor body 11 in the third direction d3, while the second conductor film CF2 extends to both end faces (the top end face and the bottom end face in FIG. 1B) of the capacitor body 11 in the second direction d2 and a part of the first conductor film CF1 (refer to one of extended portions CF2a in FIG. 6), as shown in FIG. 6. For reference, when the third-direction dimension D3 [11] of the capacitor body 11 is 70 µm, and the radius of curvature of the rounded parts RN is 10 µm, a maximum third-direction dimension D3 [CF2a]

of each of the extended portions CF2a falls roughly between one-third and three-fifths a third-direction dimension D3 [CF1] of the first conductor film CF1. It should be noted that the thickness of the second conductor film CF2 formed here is preferably around 1 μm.

Figure 7:
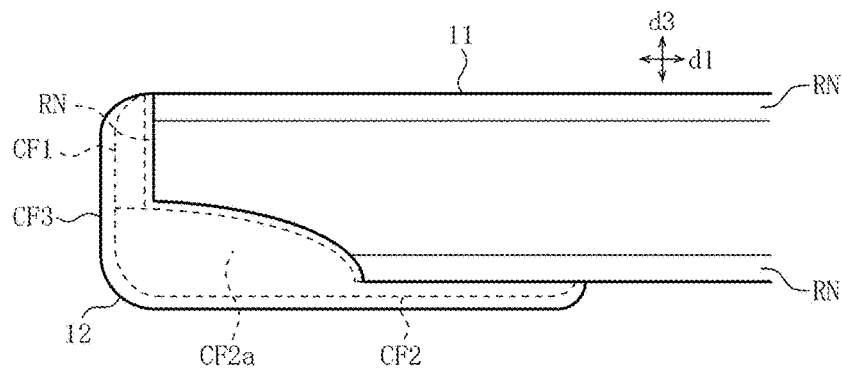
FIG. 7 is a drawing explaining a method for producing the external electrodes shown in FIGS. 1A to 1D.

Once the second conductor film CF2 has been formed, a third conductor film CF3 made of copper is formed on the capacitor body 11 by means of electroplating or other wet plating method, as shown in FIG. 7. While the third conductor film CF3 is formed in a manner covering the surfaces of the first conductor film CF1 and the second conductor film CF2, it is possible that, so long as the outer periphery portion of the first conductor film CF1 does not go over the rounded parts RN around the peripheries of respective end faces of the capacitor body 11 in the first direction d1 (refer to FIG. 4), the outer periphery portion of the third conductor film CF3 covering the first conductor film CF1 can be kept from going over the rounded parts RN around the peripheries of respective end faces of the capacitor body 11 in the first direction d1. In other words, allowing the outer periphery portion of the third conductor film CF3 covering the first conductor film CF1 to go over the rounded parts RN around the peripheries of respective end faces of the capacitor body 11 in the first direction d1, inhibits the thickness reduction of the multilayer ceramic capacitor 10 due to the portion going over the rounded parts RN; if the outer periphery portion does not go over the rounded parts RN, however, such inhibition does not occur. It should be noted that the thickness of the third conductor film CF3 formed here is preferably around 2 μm.

Figure 8A:
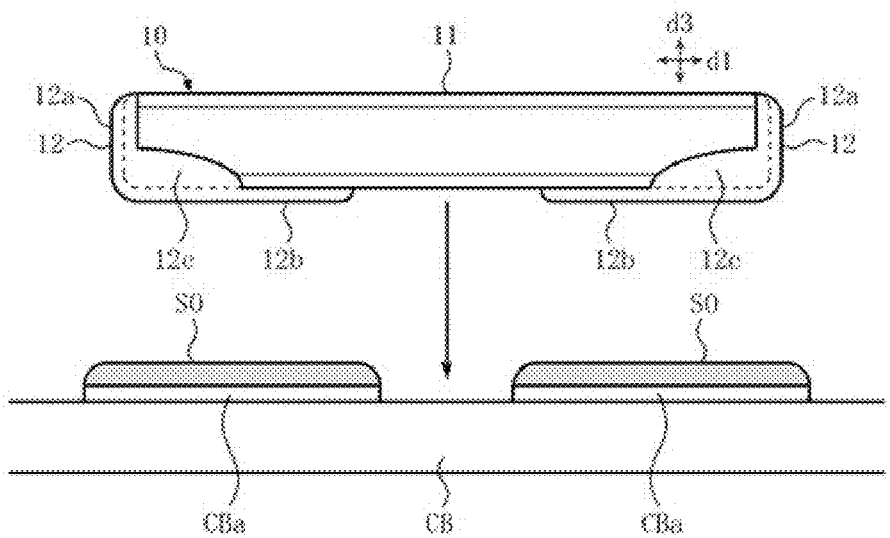
FIGS. 8A and 8B are drawings explaining, e.g., the wetting by molten solder when the external electrodes of the multilayer ceramic capacitor shown in FIGS. 1A to 1D are soldered to conductor pads on a circuit board.
Figure 8B:
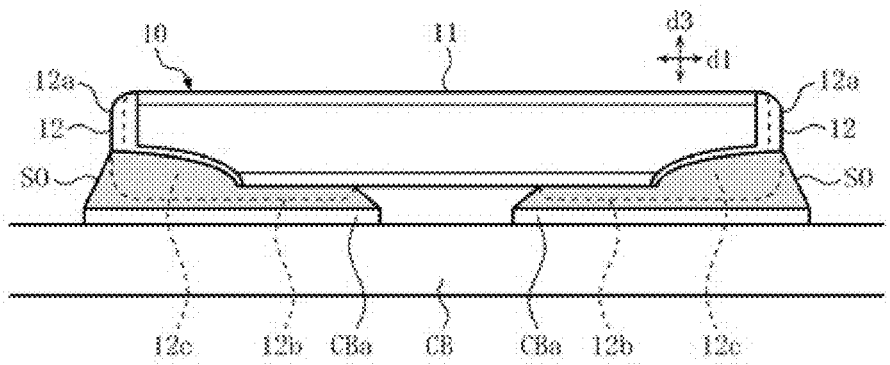

Next, FIGS. 8A and 8B are used to explain, e.g., the wetting by molten solder when the external electrodes 12 of the multilayer ceramic capacitor 10 shown in FIGS. 1A to 3 are soldered to conductor pads CBa on a circuit board CB.

In the case of reflow soldering, a cream solder SO is applied, by means of screen printing, etc., on the respective conductor pads CBa on the circuit board CB corresponding to the external electrodes 12 of the multilayer ceramic capacitor 10, as shown in FIG. 8A. Then, the multilayer ceramic capacitor 10 is moved in the direction of the arrow, and then the second planar part 12b of each of the external electrodes 12 is pressed against the cream solder SO applied on the respective conductor pads CBa, to install the multilayer ceramic capacitor 10 on the circuit board CB. Then, the circuit board CB on which the multilayer ceramic capacitor 10 has been installed is put in a reflow oven to melt, and then cure, the cream solder to achieve the prescribed soldering.

Since the cream solder SO applied to each of the conductor pads CBa melts while in contact with the second planar part 12b of each of the external electrodes 12, some of the molten solder SO flows to the space between each of the conductor pads CBa and the second planar part 12b of each of the external electrodes 12, and also around the periphery of the second planar part 12b of each of the external electrodes 12, and the remainder of the molten solder SO tends to wet the first planar part 12a of each of the external electrodes 12.

However, each of the external electrodes 12 has, continuously with the first planar part 12a and the second planar part 12b, the auxiliary planar parts 12c which are present on both end faces (the top end face and the bottom end face in FIG. 1B) of the capacitor body 11 in the second direction d2; accordingly, the remainder of the molten solder SO wets the first planar part 12a of each of the external electrodes 12, while at the same time also wetting the auxiliary planar parts 12c continuously connected to the first planar part 12a, as shown in FIG. 8B. In other words, the target of wetting by the remainder of the molten solder SO can be distributed to the first planar part 12a and also to each of the auxiliary planar parts 12c, and this can suppress wetting exclusively the first planar part 12a.

In addition, the maximum third-direction dimension D3 [12c] of each of the auxiliary planar parts 12c of each of the external electrodes 12 is smaller than the third-direction dimension D3 [12a] of the first planar part 12a of each of the external electrodes 12; accordingly, the wetting of each of the auxiliary planar parts 12c by the molten solder SO can be limited, and this limitation in turn limits the wetting of the first planar part 12a by the molten solder SO, so that the wetting, by the molten solder SO, of the first planar part 12a over its entire length and width, can be reduced.

Furthermore, the first-direction dimension D1 [12c] of each of the auxiliary planar parts 12c of each of the external electrodes 12 is smaller than the first-direction dimension D1 [12b] of the second planar part 12b of each pf the external electrodes 12; accordingly, each of the auxiliary planar parts 12c is wetted by the molten solder SO, and this in turn can reduce the inhibition of flows of some of the molten solder SO to the space between each of the conductor pads CBa and the second planar part 12b of each of the external electrodes 12, and also to the periphery of the second planar part 12b of each of the external electrodes 12.

In other words, the first planar part 12a of each of the external electrodes 12 can be wetted by the molten solder SO not unevenly, but roughly uniformly instead, which means that, even when the multilayer ceramic capacitor 10 (the capacitor body 11) is thin, the occurrences of separation, rise, and other phenomena of the multilayer ceramic capacitor 10 during soldering due to different wettings, can be prevented as much as possible.

On the other hand, when installing the multilayer ceramic capacitor 10 on the circuit board CB by pressing the second planar part 12b of each of the external electrodes 12 against the cream solder SO applied on each of the conductor pads CBa on the circuit board CB, the multilayer ceramic capacitor 10 deflects (deflects downward in FIG. 8B) due to the pressing force from a mounter transfer equipment, etc.

However, each of the external electrodes 12 has, continuously with the first planar part 12a and the second planar part 12b, the auxiliary planar parts 12c which are present on both end faces (the top end face and the bottom end face in FIG. 1B) of the capacitor body 11 in the second direction d2; accordingly, any three-dimensional deflection occurring in the multilayer ceramic capacitor 10 during the installation mentioned above can be reduced by each of the external electrodes 12.

This means that, when the multilayer ceramic capacitor 10 is installed on the circuit board CB, any deflection of the multilayer ceramic capacitor 10 can be reduced by the respective auxiliary planar parts 12c, and this in turn can prevent as much as possible cracks that would otherwise occur, due to such deflection, on the capacitor body 11 even when the multilayer ceramic capacitor 10 becomes thin.

Next, the operations and effects achieved by the multilayer ceramic capacitor 10 shown in FIGS. 1 to 3 are explained.

(Operations and Effects 1)

Because each of the external electrodes 12 has, continuously with the first planar part 12a and the second planar part 12b, the auxiliary planar parts 12c which are present on both end faces (the top end face and the bottom end face in FIG. 1B) of the capacitor body 11 in the second direction d2, the wetting by the remainder of the molten solder SO can be distributed to the first planar part 12a and also to each of the auxiliary planar parts 12c, and therefore the wetting of solely the first planar part 12a can be suppressed, when each of the external electrodes 12 of the multilayer ceramic capacitor 10 is soldered to the conductor pads CBa on the circuit board CB. In addition, the maximum third-direction dimension D3 [12c] of each of the auxiliary planar parts 12c is smaller than the third-direction dimension D3 [12a] of the first planar part 12a of each of the external electrodes 12; accordingly, the wetting of each of the auxiliary planar parts 12c by the molten solder SO can be limited, and this limitation in turn limits the wetting of the first planar part 12a by the molten solder SO, so that the wetting, by the molten solder SO, of the first planar part 12a over its entire length and width, can be reduced. Furthermore, the first-direction dimension D1 [12c] of each of the auxiliary planar parts 12c is smaller than the first-direction dimension D1 [12b] of the second planar part 12b of each of the external electrodes 12; accordingly, each of the auxiliary planar parts 12c is wetted by the molten solder SO, and this in turn can reduce the inhibition of flows of some of the molten solder SO to the space between each of the conductor pads CBa and the second planar part 12b of each of the external electrodes 12, and also to the periphery of the second planar part 12b of each of the external electrodes 12. In other words, the first planar part 12a of each of the external electrodes 12 can be wetted by the molten solder SO uniformly, which means that, even when the multilayer ceramic capacitor 10 (the capacitor body 11) is thin, the occurrences of separation, rise, and other phenomena of the multilayer ceramic capacitor 10 during soldering due to different wettings, can be prevented as much as possible.

Moreover, each of the external electrodes 12 has, continuously with the first planar part 12a and the second planar part 12b, the auxiliary planar parts 12c which are present on both end faces (the top end face and the bottom end face in FIG. 1B) of the capacitor body 11 in the second direction d2; accordingly, any three-dimensional deflection occurring in the multilayer ceramic capacitor 10 when the multilayer ceramic capacitor 10 is installed on the circuit board CB by pressing the second planar part 12b of each of the external electrodes 12 against the cream solder SO applied on each of the conductor pads CBa on the circuit board CB, can be reduced at each of the external electrodes 12. This means that, when the multilayer ceramic capacitor 10 is installed on the circuit board CB, any deflection of the multilayer ceramic capacitor 10 can be reduced by the respective auxiliary planar parts 12c, and this in turn can prevent as much as possible cracks that would otherwise occur, due to such deflection, on the capacitor body 11 even when the multilayer ceramic capacitor 10 becomes thin.

(Operations and Effects 2)

Because the third-direction dimension D3 [12c] of each of the auxiliary planar parts 12c of each of the external electrodes 12 is smaller than the first-direction dimension D1 [12c] of each of the auxiliary planar parts 12c, the operations and effects described in "Operations and Effects 1" above can be effectively achieved even when the multilayer ceramic capacitor 10 (the capacitor body 11) is thin.

(Operations and Effects 3)

Since the second planar part 12b of each of the external electrodes 12 has, at both end parts of the second planar part 12b in the second direction d2, the end part portions 12b2 of which first-direction dimension D1 [12b2] becomes smaller toward each end face of the capacitor body 11 in the second direction d2, and the minimum first-direction dimension D1 [12b2] of each of the end part portions 12b2 corresponds to the first-direction dimension D1 [12c] of each of the auxiliary planar parts 12c, each of the auxiliary planar parts 12c can be produced with ease.

(Operations and Effects 4)

Since the capacitor body 11 has the rounded parts RN covering all of its ridges and corners, and the first planar part 12a, the second planar part 12b, and the auxiliary planar parts 12c of each of the external electrodes 12 are continuously connected to each other along the rounded parts RN, these rounded parts RN can be utilized to minimize the third-direction dimension D3 [12a] of the first planar part 12a and thereby contribute to the thickness reduction of the multilayer ceramic capacitor 10.

(Operations and Effects 5)

Since each of the external electrodes 12 is constituted by a combination of the first conductor film CF1, the second conductor film CF2, and the third conductor film CF3, wherein the second planar part 12b in particular is constituted by the second conductor film CF2 and the third conductor film CF3, the second planar part 12b can be formed thinly to contribute to the thickness reduction of the multilayer ceramic capacitor 10.

(Operations and Effects 6)

Since the first-direction dimension D1 [11], the second-direction dimension D2 [11] and the third-direction dimension D3 [11] of the capacitor body 11 have a dimensional relation of "the third-direction dimension D3 [11]<the first-direction dimension D1 [11]<the second-direction dimension D2 [11]," this relation can also contribute to the lowering of the ESL of the multilayer ceramic capacitor 10.

Next, variation examples that can achieve operations and effects roughly similar to those achieved by the multilayer ceramic capacitor 10 shown in FIGS. 1 to 3, are explained.

Variation Example 1

While the capacitor body 11 is shown as an example which has the first-direction dimension D1 [11] of 500 μm, the second-direction dimension D2 [11] of 1000 μm, and the third-direction dimension D3 [11] of 70 μm, as reference dimensions, the first-direction dimension D1 [11] and the second-direction dimension D2 [11] of the capacitor body 11 are not limited in any way. It should be noted that, in the case of the thin multilayer ceramic capacitor 10, the numerical value of the first-direction dimension D1 [11] of the capacitor body 11 may be in a range of 200 to 500 μm as an example, while the numerical value of the second-direction dimension D2 [11] of the capacitor body 11 may be in a range of 400 to 1000 μm as an example. In addition, the third-direction dimension D3 [11] of the capacitor body 11 is not limited in any way, either. It should be noted that, in the case of the thin multilayer ceramic capacitor 10, the numerical value of the third-direction dimension D3 [11] of the capacitor body 11 may be in a range of 65 to 120 μm, or in a smaller range of 35 to 65 μm, as an example.

Variation Example 2

Figure 9:
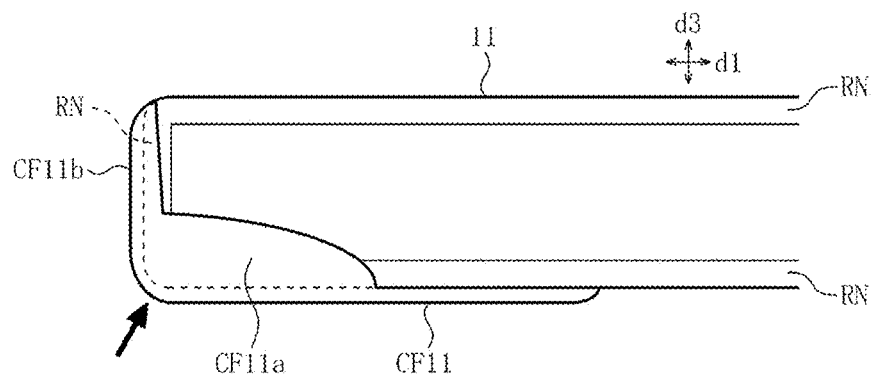
FIG. 9 is a drawing explaining another method for producing the external electrodes shown in FIGS. 1A to 1D.
Figure 10:
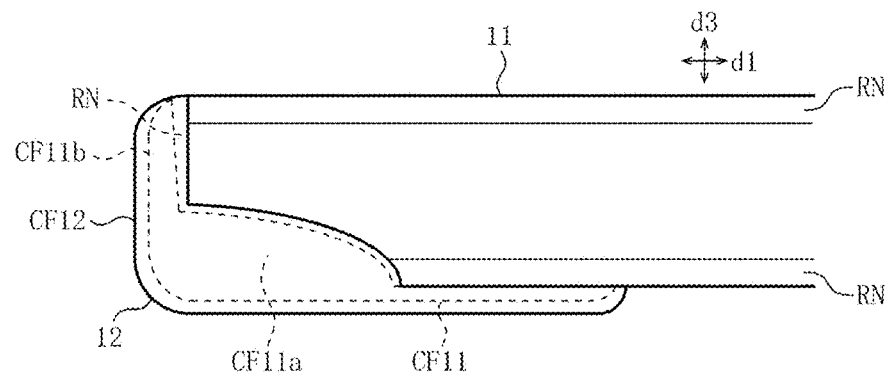
FIG. 10 is a drawing explaining another method for producing the external electrodes shown in FIGS. 1A to 1D.

While each of the external electrodes 12 is shown as an example which consists of the three conductor films CF1 to CF3, each of the external electrodes 12 may be constituted by two conductor films (a first conductor film CF11 and a second conductor film CF12), as shown in FIGS. 9 and 10. The following explains a production method where the primary component of the first conductor film CF11 is nickel, and the primary component of the second conductor film CF12 is copper. It should be noted that the production method explained here is only a preferred example and does not limit in any way how the external electrodes 12 are produced.

In this case, the sintered capacitor body 11, as described above, is prepared before the external electrodes 12 are produced. Then, the mask MA (refer to FIG. 5) having a shape that corresponds to the outline of the second planar part 12b of each of the external electrodes 12 is provided on one end face (the bottom end face in FIG. 1A) of the capacitor body 11 in the third direction d3, after which the first conductor film CF11 made of nickel is formed, by means of sputtering, vacuum deposition, or other dry plating method, toward the ridge connecting one end face (the bottom end face in FIG. 1A) in the third direction d3, and one end face (the left end face in FIG. 1B) in the first direction d1, of the capacitor body 11, and also toward the ridge connecting one end face (the bottom end face in FIG. 1A) in the third direction d3, and the other end face (the right end face in FIG. 1B) in the first direction d1, of the capacitor body 11, as shown by the arrow in FIG. 9. Because the rounded parts RN are present around the periphery of each end in the second direction d2, and also present around the periphery of each end face in the first direction d1, of the capacitor body 11, the first conductor film CF11 is formed, in a shape corresponding to the mask MA, on one end face (the bottom end face in FIG. 1A) of the capacitor body 11 in the third direction d3, as shown in FIG. 9, while the first conductor film CF 11 extends to both end faces (the top end face and the bottom end face in FIG. 1B) of the capacitor body 11 in the second direction d2 and to the respective end faces (the left end face and the right end face in FIG. 1A) (refer to extended portions CF11a and 11b in FIG. 9). For reference, when the third-direction dimension D3 [11] of the capacitor body 11 is 70 μm and the radius of curvature of the rounded parts RN is 10 μm, a maximum third-direction dimension D3 [CF11a] of the extended portion CF11a falls roughly between one-third and three-fifths the third-direction dimension D3 [11] of the capacitor body 11, while a maximum third-direction dimension D3 [CF11b] of the extended portion CF11b falls roughly around four-fifths the third-direction dimension D3 [11] of the capacitor body 11. It should be noted that the thickness of the first conductor film CF11 formed here is preferably around 1 μm.

Once the first conductor film CF11 has been formed, the second conductor film CF12 made of copper is formed on the capacitor body 11, by means of electroplating or other wet plating method. While the second conductor film CF12 is formed in a manner covering the surface of the first conductor film CF11, it is possible that, so long as the extended portion CF11b of the first conductor film CF11 does not go over the rounded parts RN around the peripheries of respective end faces of the capacitor body 11 in the first direction d1 (refer to FIG. 9), the outer periphery portion of the second conductor film CF12 covering the extended portion CF11b of the first conductor film CF11 can be kept from going over the rounded parts RN around the peripheries of respective end faces of the capacitor body 11 in the first direction d1. In other words, allowing the outer periphery portion of the second conductor film CF12 covering the extended portion CF11b of the first conductor film CF11 to go over the rounded parts RN around the peripheries of respective end faces of the capacitor body 11 in the first direction d1, inhibits the thickness reduction of the multilayer ceramic capacitor 10 due to the portion going over these parts; if the outer periphery portion does not go over the rounded parts RN, however, such inhibition does not occur. It should be noted that the thickness of the second conductor film CF12 formed here is preferably around 1 μm.

The external electrodes 12 thus produced each have the first conductor film CF11 provided continuously to the respective end faces (the left end face and the right end face in FIG. 1B) of the capacitor body 11 in the first direction d1, one end face (the bottom end face in FIG. 1A) of the capacitor body 11 in the third direction d3, and both end faces (the top end face and the bottom end face in FIG. 1B) of the capacitor body 11 in the second direction d2, as well as the second conductor film CF12 provided on the surface of the first conductor film CF11, and they each appear roughly identical to each of the external electrodes 12 shown in FIGS. 1A to 3.

Variation Example 3

While each of the external electrodes 12 is shown as an example which consists of the three conductor films CF1 to CF3 (refer to FIGS. 2 to 7), and their alternative is shown as an example which consists of the two conductor films CF11 and CF12 (refer to FIGS. 9 and 10), the former may further be provided with one, two, or more conductor film(s) on the surface of the third conductor film CF3 by means of any wet plating method or dry plating method, and the latter may further be provided with one, two, or more conductor film(s) on the surface of the second conductor film CF12 by means of any wet plating method or dry plating method. Preferably for the primary component of any of these additional conductor films, a metal selected from the group that includes copper, tin, nickel, gold, zinc, alloys thereof, and the like may be used.

Variation Example 4

Figure 11A:
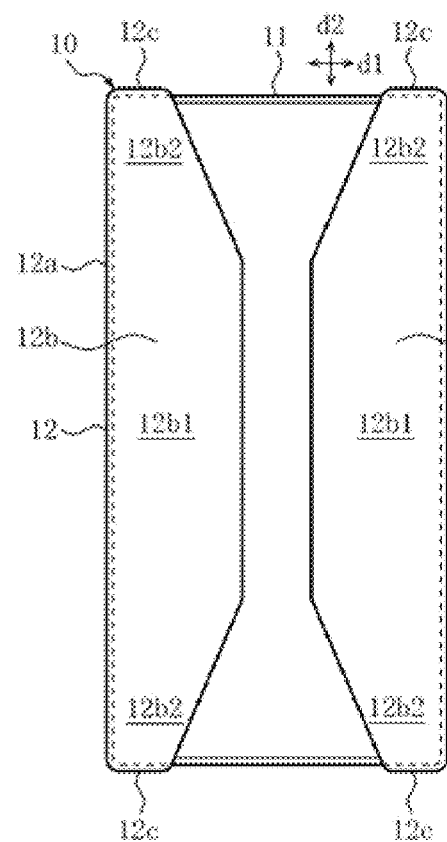
FIGS. 11A and 11B are drawings, each showing variations (different shapes) of the second planar parts of the external electrodes shown in FIGS. 1A to 1D.
Figure 11B:
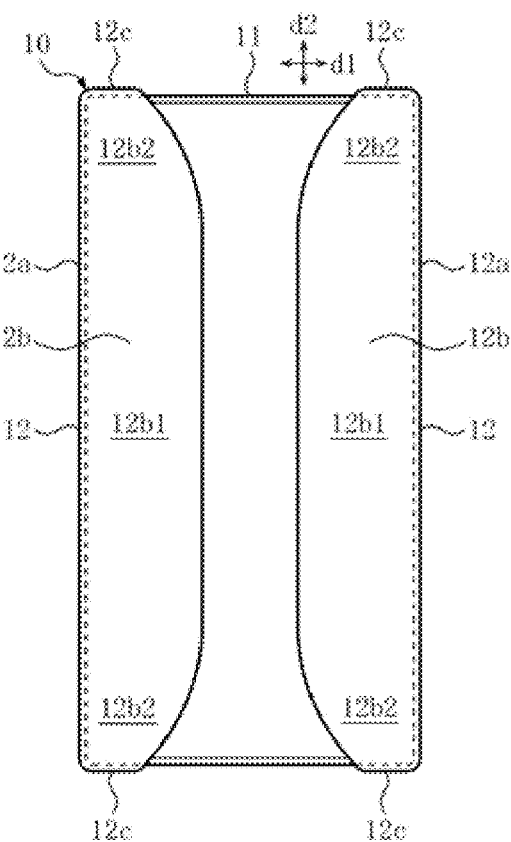

While the second planar part 12b of each of the external electrodes 12 is shown which has, at the respective end parts in the second direction d2, the end part portions 12b2 of which first-direction dimension D1 [12b2] becomes smaller toward each end face of the capacitor body 11 in the second direction d2 (refer to FIG. 1C), a second-direction dimension D2 [12b2] of each of the end part portions 12b2, as shown in FIG. 11A, may be somewhat larger, or smaller in other cases not illustrated here, than what is shown in FIG. 1C. In addition, while the outline of each of the end part portions 12b2 shown is a straight line (refer to FIG. 1C), this outline can be changed to the convex curving line shown in FIG. 11B by changing the shape of the mask MA shown in FIG. 5.

Variation Example 5

While the capacitor body 11 is shown which has a dimensional relation of "the third-direction dimension D3 [11]<the first-direction dimension D1 [11]<the second-direction dimension D2 [11]," the capacitor body 11 may have a dimensional relation of "the third-direction dimension D3 [11]<the first-direction dimension D1 [11]=the second-direction dimension D2 [11]," or the capacitor body 11 may have a dimensional relation of "the third-direction dimension D3 [11]<the second-direction dimension D2 [11]<the first-direction dimension D1 [11]."

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, "a" may refer to a species or a genus including multiple species, and "the invention" or "the present invention" may refer to at least one of the embodiments or aspects explicitly, necessarily, or inherently disclosed herein. The terms "constituted by" and "having" refer independently to "typically or broadly comprising", "comprising", "consisting essentially of", or "consisting of" in some embodiments. In this disclosure, any defined meanings do not necessarily exclude ordinary and customary meanings in some embodiments.

The present application claims priority to Japanese Patent Application No. 2017-183248, filed Sep. 25, 2017, the disclosure of which is incorporated herein by reference in its entirety including any and all particular combinations of the features disclosed therein.

It will be understood by those of skill in the art that numerous and various modifications can be made without departing from the spirit of the present invention. Therefore, it should be clearly understood that the forms of the present invention are illustrative only and are not intended to limit the scope of the present invention.

I claim:

1. A multilayer ceramic capacitor, comprising:
a capacitor body of roughly rectangular solid shape which has a capacitive part constituted by multiple internal electrode layers stacked together with dielectric layers in between;
a first external electrode which is provided at one of two opposing end parts of the capacitor body and to which some of the multiple internal electrode layers are connected; and
a second external electrode which is provided at the other of two opposing end parts of the capacitor body and to which the remainder of the multiple internal electrode layers are connected;
wherein, the multilayer ceramic capacitor is characterized in that, when, with respect to the capacitor body, the direction in which two opposing faces are facing each other represents a first direction, the direction in which other two opposing faces are facing each other represents a second direction, the direction in which the remaining two opposing faces are facing each other represents a third direction, and the dimensions along the respective directions represent a first-direction dimension, a second-direction dimension and a third-direction dimension, then:
the first external electrode continuously has a first planar part present on one end face of the capacitor body in the first direction, a second planar part present on one end face of the capacitor body in the third direction, and auxiliary planar parts present on both end faces of the capacitor body in the second direction;
the second external electrode continuously has a first planar part present on the other end face of the capacitor body in the first direction, a second planar part present on one end face of the capacitor body in the third direction, and auxiliary planar parts present on both end faces of the capacitor body in the second direction;
a maximum third-direction dimension of each of the auxiliary planar parts of the first external electrode is smaller than the third-direction dimension of the first planar part of the first external electrode, while a maximum first-direction dimension of each of the auxiliary planar parts is smaller than a maximum first-direction dimension of the second planar part of the first external electrode; and
a maximum third-direction dimension of each of the auxiliary planar parts of the second external electrode is smaller than the third-direction dimension of the first planar part of the second external electrode, while a maximum first-direction dimension of each of the auxiliary planar parts is smaller than a maximum first-direction dimension of the second planar part of the second external electrode.

2. The multilayer ceramic capacitor according to claim 1, wherein:
the maximum third-direction dimension of each of the auxiliary planar parts of the first external electrode is smaller than a maximum first-direction dimension of each of the auxiliary planar parts; and
the maximum third-direction dimension of each of the auxiliary planar parts of the second external electrode is smaller than a maximum first-direction dimension of each of the auxiliary planar parts.

3. The multilayer ceramic capacitor according to claim 1, wherein:
the second planar part of the first external electrode has, at both end parts of the second planar part in the second direction, end part portions whose first-direction dimension becomes smaller toward each end face of the capacitor body in the second direction, while a minimum first-direction dimension of each of the end part portions corresponds to the maximum first-direction dimension of each of the auxiliary planar parts of the first external electrode; and
the second planar part of the second external electrode has, at both end parts of the second planar part in the second direction, end part portions whose first-direction dimension becomes smaller toward each end face of the capacitor body in the second direction, while a minimum first-direction dimension of each of the end part portions corresponds to the maximum first-direction dimension of each of the auxiliary planar parts of the second external electrode.

4. The multilayer ceramic capacitor according to claim 1, wherein:
the capacitor body has rounded parts covering all of its ridges and corners;
the first planar part, the second planar part, and the auxiliary planar parts of the first external electrode are continuously connected to each other along the rounded parts; and
the first planar part, the second planar part, and the auxiliary planar parts of the second external electrode are continuously connected to each other along the rounded parts.

5. The multilayer ceramic capacitor according to claim 1, wherein:
the first external electrode at least has:
a first conductor film provided on one end face of the capacitor body in the first direction;
a second conductor film provided continuously on a part of the first conductor film, one end face of the capacitor body in the third direction, and both end faces of the capacitor body in the second direction; and a third conductor film provided on the surfaces of the first conductor film and the second conductor film; and the second external electrode at least has:
- a first conductor film provided on the other end face of the capacitor body in the first direction;
- a second conductor film provided continuously on a part of the first conductor film, one end face of the capacitor body in the third direction, and both end faces of the capacitor body in the second direction; and
- a third conductor film provided on the surfaces of the first conductor film and the second conductor film.

6. The multilayer ceramic capacitor according to claim 1, wherein:

the first external electrode at least has:
- a first conductor film provided continuously on one end face of the capacitor body in the first direction, one end face of the capacitor body in the third direction, and both end faces of the capacitor body in the second direction; and
- a second conductor film provided on the surface of the first conductor film; and the second external electrode at least has:
- a first conductor film provided continuously on the other end face of the capacitor body in the first direction, one end face of the capacitor body in the third direction, and both end faces of the capacitor body in the second direction; and
- a second conductor film provided on the surface of the first conductor film.

7. The multilayer ceramic capacitor according to claim 1, wherein:

a first-direction dimension, a second-direction dimension, and a third-direction dimension of the capacitor body have a dimensional relation of "the third-direction dimension<the first-direction dimension<the second-direction dimension."

8. The multilayer ceramic capacitor according to claim 1, wherein:

the third-direction dimension of the capacitor body is set in a range of 65 to 120 μm.

9. The multilayer ceramic capacitor according to claim 1, wherein:

the third-direction dimension of the capacitor body is set in a range of 35 to 65 μm.

* * * * *